J. H. GILMAN.
CORN SHELLER.
APPLICATION FILED MAR. 24, 1910.
1,018,820.
Patented Feb. 27, 1912.
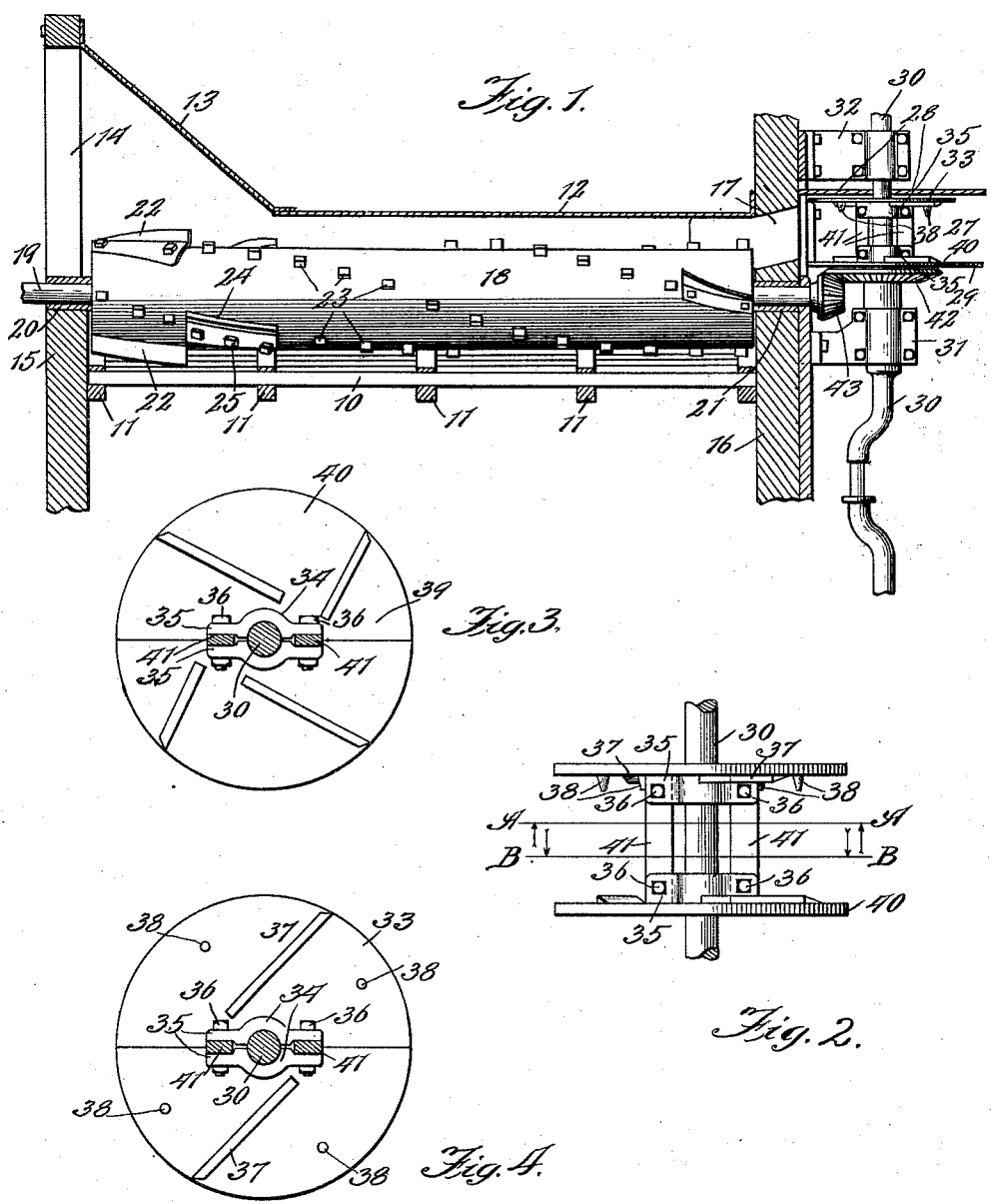

UNITED STATES PATENT OFFICE.

JOHN H. GILMAN, OF OTTAWA, ILLINOIS, ASSIGNOR TO KING & HAMILTON COMPANY, OF OTTAWA, ILLINOIS, A CORPORATION OF ILLINOIS.

CORN-SHELLER.

1,018,820. Specification of Letters Patent. Patented Feb. 27, 1912.

Application filed March 24, 1910. Serial No. 551,366.

*To all whom it may concern:*

Be it known that I, JOHN H. GILMAN, a citizen of the United States, and a resident of Ottawa, in the county of La Salle and State of Illinois, have invented certain new and useful Improvements in Corn-Shellers, of which the following is a full, clear, and exact specification.

My invention is concerned with corn shellers of the general type shown in my Patent No. 761,068, dated May 31, 1904, and is designed to facilitate the discharge of the husks and cobs from the cylinder.

To this end my invention consists of certain novel constructions and combinations of elements which will be described in detail and particularly pointed out in the claims.

To illustrate my invention, I annex hereto a sheet of drawings, in which the same reference characters are used to designate identical parts in all the figures, of which,—

Figure 1 is a central, longitudinal, vertical section through so much of a shelling cylinder and its connections as is necessary to illustrate my invention; Fig. 2 is an enlarged side elevation showing the discharging disks; Fig. 3 is a plan view on the line B—B of Fig. 2; and Fig. 4 is an inverted plan view on the line A—A of Fig. 2.

As is well known, in this type of machine a concave is employed, which I have illustrated as composed on its under half of a plurality of bars 10 passed through suitable apertures in the semicircular rings 11, so as to form the roughened surface for shelling and permit the passage of the grains of corn, while the upper half of the concave is composed of the sheet-metal cylinder 12, the forward portion 13 thereof being flared out to form a sort of a hopper into which the corn on the ear is fed, through the receiving aperture 14 formed in the head 15 of the concave. The other end of the concave is formed by the head 16, which has the discharge aperature 17 therein. The cylinder 18 has the shaft 19 journaled in suitable bearings 20 and 21 placed in the heads 15 and 16, and its surface is toothed or corrugated, or otherwise roughened, so as to coöperate with the bars 10 of the concave to shell the corn off of the cob as the ears are driven from the front to the rear by the feeding wings 22 and the spiral arrangement of the teeth or projections 23. The mechanism thus far described is the same as that shown in my aforesaid Patent No. 761,068.

I have found by experience that where the sheller is given a large capacity, the feeding wings 22 are insufficient, and to increase the efficiency of the feeding mechanism I add a pair of similar wings 24, which consist of helically-curved angle-bars adapted to be secured to the cylinder by bolts 25, and these additional wings 24 are located half way between and in advance of the wings 22, they taking the place of a portion of two of the helically-arranged rows of teeth 23. By the addition of these wings 24 thus located, I find that the feeding capacity of the machine is increased to the necessary extent without interfering at all with the action of the shelling mechanism proper.

The discharge aperture 17 opens into a passage 27 leading to the customary outlets, through the lower one of which the cobs drop, and through the upper one of which the husks and silks are drawn by a current of air. The top of this passage is formed by the plates 28, and the bottom is partially formed by the plate 29. To carry the husks and cobs from the aperture 17 into the passage 27, I secure to the drive shaft 30, which is journaled in bearings 31 and 32 secured to the head 16, a disk 33, which is conveniently constructed of two similar halves having clamping jaws 34 and ears 35, so that by passing bolts 36 through the ears, the two halves can be securely clamped on the shaft 30. The lower surface of the disk 33 is provided with suitable projections to engage the husks and carry them through as the shafts rotate, and for this purpose I preferably employ the two tangentially arranged ribs 37 and the four pins 38 which project downward a greater distance than the comparatively shallow ribs 37. I preferably also employ an opposing disk 39, having similar clamping jaws 34 and ears 35, but instead of employing the two ribs 37 and the four pins 38, I preferably employ the four ribs 40. To prevent the husks winding on the shaft 30, I preferably interpose the pair of bars 41, which have their ends apertured and are conveniently clamped between the ears 35. The shaft 30 below the disk 39 is provided with the bevel gear wheel 42, which meshes with the bevel pinion 43 secured on the end of the shaft 19, so that the shafts 19 and 30 will rotate at the proper relative rates of speed; and it will be apparent that as the cobs and husks are fed through the aperture 17, they will be engaged by the projections on the disks 33 and 39 and carried to one side of the shaft 30 and on into the passage 27.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a corn sheller, the combination with a concave having a discharge aperture therein, of a rotating shelling member journaled therein, a disk journaled to rotate above and adjacent said discharge aperture, for the purpose described, and a coacting member opposed to said disk.

2. In a corn sheller, the combination with a concave having a discharge aperture therein, of a rotating shelling member journaled therein, and two disks journaled to rotate, one above and the other below, and adjacent said discharge aperture, for the purpose described.

3. In a corn sheller, the combination with a concave having a discharge aperture therein, of a rotating shelling member journaled therein, a disk journaled to rotate above and adjacent said discharge aperture and having ribs on its under surface, for the purpose described, and a coacting member opposed to said disk.

4. In a corn sheller, the combination with a concave having a discharge aperture therein, of a rotating shelling member journaled therein, a disk journaled to rotate above and adjacent said discharge aperture and having pins on its under surface, for the purpose described, and a coacting member opposed to said disk.

5. In a corn sheller, the combination with a concave having a discharge aperture therein, of a rotating shelling member journaled therein, and two disks journaled to rotate one above and the other below and adjacent said discharge aperture, and having projections on their opposed faces, for the purpose described.

6. In a corn sheller, the combination with a concave having a discharge aperture therein, of a rotating shelling member journaled therein, and two disks journaled to rotate one above and the other below and adjacent said discharge aperture, said disks having ribs on their opposed faces, for the purpose described.

7. In a corn sheller, the combination with a concave having a discharge aperture therein, of a rotating shelling member journaled therein, and two disks journaled to rotate one above and the other below and adjacent said discharge aperture, the upper disk having ribs and pins and the lower disk having ribs on their opposed surfaces, for the purpose described.

8. In a corn sheller, the combination with a concave having a discharge aperture therein, of a rotating shelling member journaled therein, a shaft rotating transversely of the aperture, a pair of disks secured to said shaft, one above and the other below and adjacent said discharge aperture, and connecting bars between said disks.

9. In a corn sheller, the combination with a concave having a discharge aperture therein, of a rotating shelling member journaled therein, a shaft rotating transversely of the aperture, a pair of disks, each made of two halves having the clamping jaws and ears, and bars secured between the ears, substantially as and for the purpose described.

In witness whereof, I have hereunto set my hand and affixed my seal this 3rd day of March, A. D. 1910.

JOHN H. GILMAN. [L. S.]

Witnesses:
   August Ledrich,
   Edward R. Claus.

---

Copies of this patent may be obtained for five cents each, by addressing the "Commissioner of Patents, Washington, D. C."